(12) United States Patent
Onishi

(10) Patent No.: US 10,418,854 B2
(45) Date of Patent: Sep. 17, 2019

(54) CONTROL DEVICE, POWER RECEIVING DEVICE, AND ELECTRONIC APPARATUS

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 15/906,869

(22) Filed: Feb. 27, 2018

(65) Prior Publication Data

US 2018/0254666 A1 Sep. 6, 2018

(30) Foreign Application Priority Data

Mar. 2, 2017 (JP) ................. 2017-039213

(51) Int. Cl.
*H02J 50/10* (2016.01)
*H02J 7/02* (2016.01)
*H02J 7/00* (2006.01)
*H02J 50/90* (2016.01)
*H02J 50/80* (2016.01)

(52) U.S. Cl.
CPC ............ *H02J 50/10* (2016.02); *H02J 7/0031* (2013.01); *H02J 7/0068* (2013.01); *H02J 7/025* (2013.01); *H02J 50/90* (2016.02); *H02J 50/80* (2016.02); *H02J 2007/004* (2013.01); *H02J 2007/0039* (2013.01)

(58) Field of Classification Search
CPC .. H02J 50/10; H02J 50/90; H02J 50/80; H02J 7/0031; H02J 7/0068; H02J 7/025
USPC .......................................................... 320/108
See application file for complete search history.

(56) References Cited

U.S. PATENT DOCUMENTS

| | | | | |
|---|---|---|---|---|
| 8,280,295 B2 * | 10/2012 | Naruse | ............... | G03G 21/0035 399/353 |
| 8,344,688 B2 * | 1/2013 | Yoda | ....................... | H02J 7/025 320/107 |
| 8,836,273 B2 * | 9/2014 | Yoda | ....................... | H02J 7/025 320/105 |
| 9,673,636 B2 * | 6/2017 | Yoda | ....................... | H02J 7/025 |
| 9,926,880 B2 * | 3/2018 | Nishida | .................... | F02D 41/20 |
| 2008/0100272 A1 * | 5/2008 | Yoshio | ..................... | G05F 1/56 323/266 |
| 2008/0197804 A1 | 8/2008 | Onishi et al. | | |
| 2009/0001932 A1 | 1/2009 | Kamijo et al. | | |

FOREIGN PATENT DOCUMENTS

| | | | |
|---|---|---|---|
| JP | 2008-206232 A | 9/2008 |
| JP | 2009-011129 A | 1/2009 |
| JP | 2016-214025 A | 12/2016 |
| JP | 2016-214027 A | 12/2016 |

* cited by examiner

*Primary Examiner* — M Baye Diao
(74) *Attorney, Agent, or Firm* — Oliff PLC

(57) ABSTRACT

A control device for a power receiving device that receives power supplied from a power transmitting device by contactless power transmission, including a charger that charges a battery based on the received power, a discharger that performs discharging operation of the battery and power supply operation in which power from the battery is supplied to a power supply target, and a controller that controls the discharger, and the controller stops the power supply operation when a magnetic detection signal from a magnetic detection element becomes active.

14 Claims, 7 Drawing Sheets

| REMOVAL DETERMINATION | SWITCH DETERMINATION | MAGNETIC DETECTION SIGNAL (HALLIN) | OTHER | DISCHARGING (POWER SUPPLY OPERATION) | POWER SUPPLY TO MAGNETIC DETECTION ELEMENT |
|---|---|---|---|---|---|
| NOT REMOVED (DOCKING DETECTED) | — | — | — | OFF | OFF |
| REMOVED | OFF OPERATION DETECTED | — | — | OFF | OFF |
| REMOVED | OFF OPERATION NOT DETECTED (ON OPERATION DETECTED) | ACTIVE (INSIDE CASE) | — | OFF | ON |
| REMOVED | OFF OPERATION NOT DETECTED (ON OPERATION DETECTED) | INACTIVE (OUTSIDE CASE) | — | ON | ON |
| REMOVED | — | — | OVER-DISCHARGE OVER-CURRENT SHUTDOWN | OFF | OFF |

FIG. 5

CONTROL DEVICE, POWER RECEIVING DEVICE, AND ELECTRONIC APPARATUS

BACKGROUND

1. Technical Field

The present invention relates to a control device, a power receiving device, an electronic apparatus, and the like.

2. Related Art

In recent years, much attention has been paid to contactless power transmission (non-contact power transmission) in which electromagnetic induction is used to make power transmission possible without contact between metal parts. Charging electronic apparatuses such as household appliances and mobile terminals has been proposed as an application example of this contactless power transmission.

JP-A-2016-214027 discloses a method for starting discharging of a battery (discharger) when removal of a power receiving device from a charger is detected and stopping discharging when landing of the power receiving device in the charger is detected. Also, JP-A-2016-214027 discloses, not only automatic on/off control by removal/landing, but also a method for turning off discharging by detecting operation of a switch.

There are conceivable cases where it is not envisioned that an electronic apparatus including a power receiving device will not be used even if removal is detected, such as a case where the electronic apparatus is carried in a case. According to JP-A-2016-214027, power consumption can be reduced by stopping, through operation of the switch, the discharging that is automatically started by detecting removal.

However, in the method according to JP-A-2016-214027, since it is necessary for a user to operate the switch to turn off a power every time the electronic apparatus is housed in the case, a large burden is imposed on the user. Also, there is a case where a switch cannot be provided due to the configuration of the apparatus. Therefore, there has been a demand for turning on/off the power supply by housing the electrical apparatus in the case.

In addition, if there are a plurality of devices that operate using power from the battery that is charged by contactless power transmission, operating the devices in synchronization is preferable in some cases. For example, if a first device controls a second device and the first device is turned off (power is not supplied), a necessity to turn on (supply power to) the second device is low. In this case, it is preferable to synchronize (interlock) turning on/off of the first device and on/off of the second device. However, known power receiving devices in a contactless power transmission system such as the system in JP-A-2016-214027 have not disclosed such a power control method.

SUMMARY

According to some aspects of the invention, a control device, a power receiving device, an electronic apparatus, and the like can be provided that perform appropriate power supply control by contactless power transmission.

Also, according to some aspects of the invention, a control device, a power receiving device, an electronic apparatus, and the like can be provided that reduce power consumption by power control using magnetic detection signals.

One aspect of the invention relates to a control device for a power receiving device that receives power supplied from a power transmitting device by contactless power transmission, including a charger configured to charge a battery based on the received power, a discharger configured to perform a discharging operation of the battery and a power supply operation in which power from the battery is supplied to a power supply target, and a controller configured to control the discharger, and the controller stops the power supply operation when a magnetic detection signal from a magnetic detection element becomes active.

In one aspect of the invention, the controller controls the power supply operation by the discharger based on the magnetic detection signal. In this way, since off control of the power supply operation can be executed using magnetism, off operation by a user can be omitted. That is, it becomes possible to reduce power consumption appropriately while reducing the burden on the user.

Also, in one aspect of the invention, the controller may start the power supply operation when the magnetic detection signal becomes inactive.

In this way, processing such as on/off control of the power supply operation using magnetism becomes possible.

Also, in one aspect of the invention, the controller may also start the power supply operation on condition that removal of the power receiving device is detected, and stop the power supply operation when the magnetic detection signal becomes inactive.

In this way, it becomes possible to start power supply automatically by removal of the power receiving device, and to stop the started power supply automatically by the magnetic detection signal, and thus it becomes possible to realize a device that is user-friendly and that can reduce power consumption, and the like.

Also, in one aspect of the invention, a power control signal terminal for controlling on and off of the power supply to the magnetic detection element may also be included, and the controller may also control activation and deactivation of the output signal of the power control signal terminal.

In this way, it becomes possible to control on/off of the magnetic detection element appropriately using an output signal of the predetermined terminal.

Also, in one aspect of the invention, the controller may also perform control to turn off the power supply to the magnetic detection element on condition that landing of the power receiving device is detected.

In this way, it becomes possible to reduce power consumption of the magnetic detection element.

Also, in one aspect of the invention, the controller may stop the power supply operation on condition that landing of the power receiving device is detected.

In this way, it becomes possible to stop the power supply operation automatically through landing of the power receiving device.

Also, in one aspect of the invention, the controller may perform control to turn off the power supply to the magnetic detection element when at least one of over-discharge and over-current is detected.

In this way, it becomes possible to reduce power consumption of the magnetic detection element.

Also, in one aspect of the invention, the controller may also perform control to turn off the power supply operation when at least one of over-discharge and over-current is detected.

In this way, due to power supply being stopped properly, it becomes possible to prevent damage of the battery, and the like.

Also, in one aspect of the invention, a monitor that monitors operation state of the switch may also be included, and the controller may also stop the power supply operation if an off operation of the switch is detected by the monitor.

In this way, it becomes possible to stop power supply operation according to user's operation.

In one aspect of the invention, the controller may also perform control to turn off the power supply to the magnetic detection element when the off operation of the switch is detected by the monitor.

In this way, it becomes possible to reduce power consumption of the magnetic detection element.

Also, another aspect of the invention relates to a control device for a power receiving device that receives power supplied from a power transmitting device by contactless power transmission, including a discharger configured to perform a discharging operation of the battery that is charged based on the received power, and that performs a power supply operation for supplying power from the battery to a power supply target, a controller configured to control the discharger, and a power control signal terminal configured to control on and off of power supply to a device that operates with battery voltage, and the controller, when removal of the power receiving device is detected, performs control to activate the output of the power control signal terminal and turn on the supply of the battery voltage to the device, and, when landing of the power receiving device is detected, performs control to deactivate the output of the power control signal terminal and turn off the supply of the battery voltage to the device.

In another aspect of the invention, power supply to a device that operates with battery voltage is controlled according to the detection result of removal/landing of the power receiving device. In this way, it becomes possible to control on/off of the device appropriately according to the state of the power receiving device.

Also, another aspect of the invention relates to a power receiving device including the control device according to any of the above descriptions.

Also, another aspect of the invention relates to a power receiving device including the control device according to any of the above descriptions and a power source supply circuit configured to control on and off of supply of battery voltage to the magnetic detection element, and the power source supply circuit includes a first transistor in which the signal from the controller is supplied to a gate terminal, and a second transistor in which a gate terminal is connected to a drain terminal of the first transistor, the battery voltage is supplied to a source terminal, and the drain terminal is connected to the magnetic detection element, and a resistor provided between the source terminal and the gate terminal of the second transistor.

According to another aspect of the invention, it becomes possible to control on/off of supply of battery voltage to the magnetic detection element by using the power source supply circuit constituted by the two transistors and a resistor.

Also, another aspect of the invention relates to an electronic apparatus including the control device according to any of the above descriptions.

BRIEF DESCRIPTION OF THE DRAWINGS

The invention will be described with reference to the accompanying drawings, wherein like numbers reference like elements.

FIG. 5 is a diagram for describing power supply control of the present embodiment.

DESCRIPTION OF EXEMPLARY EMBODIMENTS

Hereinafter, preferable embodiments of the invention will be described in detail. Note that the embodiments described below are not intended to unduly limit the content of the invention described in the scope of the claims, and not all configurations described in the embodiments are necessarily essential as solving means of the invention.

1. Electronic Apparatus

Figure 1:
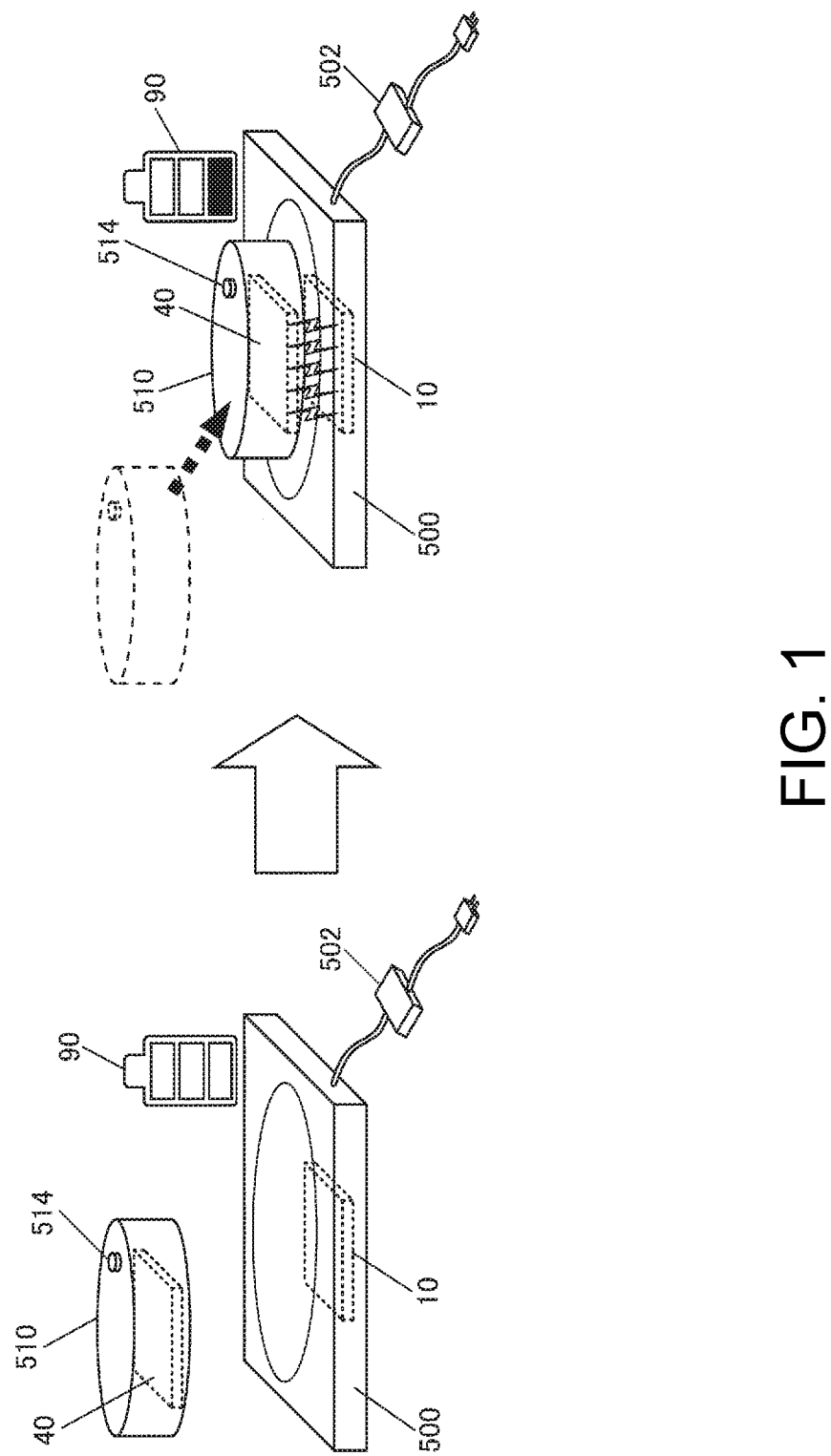
FIG. 1 is a diagram for describing a contactless power transmission system of the present embodiment.

FIG. 1 shows an example of a contactless power transmission system of the present embodiment. A charger 500 (one electronic apparatus) has a power transmitting device 10. An electronic apparatus 510 includes a power receiving device 40. Also, the electronic apparatus 510 has a switch 514 for operating and a battery 90. Note that, although the battery 90 is schematically illustrated in FIG. 1, the battery 90 is, in actuality, incorporated in the electronic apparatus 510. The contactless power transmission system of the present embodiment is constituted by the power transmitting device 10 and the power receiving device 40 in FIG. 1.

Power is supplied to the charger 500 via a power supply adaptor 502, and this power is transmitted by contactless power transmission from the power transmitting device 10 to the power receiving device 40. Accordingly, the battery 90 in the electronic apparatus 510 can be charged and a device in the electronic apparatus 510 can be caused to perform operations.

Note that a power supply of the charger 500 may be a power supply using a USB (USB cable). Also, the present embodiment may be applied to various electronic apparatuses. For example, as an electronic apparatus 510, various electronic apparatuses can be envisioned such as a hearing aid, a watch, a biological information measuring device (wearable apparatus for measuring a pulse wave or the like), a mobile information terminal (such as a smartphone or a mobile phone), a cordless telephone, a shaver, an electric toothbrush, a wrist computer, a handy terminal, an electric car, and an electric bicycle.

Figure 2:
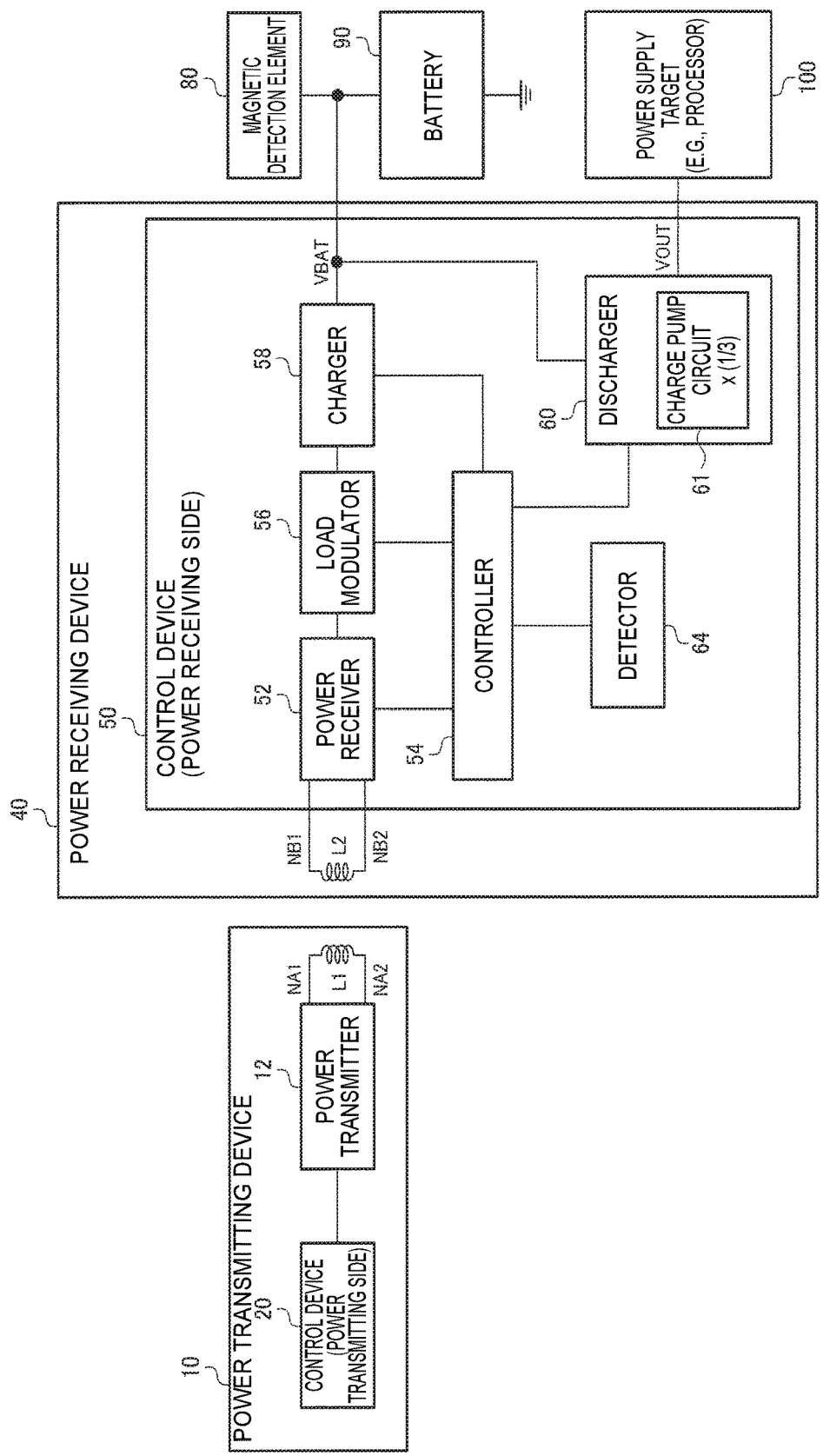
FIG. 2 is a configuration example of a power transmission device, a power receiving device, and control devices on power transmitting side and power receiving side of the present embodiment.

2. Power Transmitting Device, Power Receiving Device, and Control Devices on Power Transmitting Side and Power Receiving Side A configuration example of the power transmitting device 10, the power receiving device 40, and the control devices on the power transmitting side 20 and power receiving side 50 is shown in FIG. 2. An electronic apparatus on the power transmitting side such as the charger 500 in FIG. 1 includes at least the power transmitting device 10 in FIG. 2. Also, an electronic apparatus 510 on the power receiving side may also include at least a power receiving device 40, a battery 90, and a power supply target 100. The power supply target 100 can be various devices such as a processor (DSP, etc.). According to the configuration in FIG. 2, a non-contact power transmission (contactless power transmission) system is realized that transmits power from the power transmitting device 10 to the power receiving device 40 by electromagnetically coupling a primary coil L1 and a secondary coil L2, and charge the battery 90, and the like.

The power transmitting device 10 (transmission module, primary module) includes the primary coil L1, a power transmitter 12, and a control device 20.

The power receiving device 40 (power receiving module, secondary module) includes the secondary coil L2 and the control device 50. Note that the power receiving device 40 is not limited to the configuration in FIG. 2, and various modifications in which some of the constituent elements are omitted, other constituent elements are added, the connective relation is changed, and the like can be implemented.

The control device 50 performs various types of control processing of the power receiving side, and can be realized by a logic circuit (IC) or the like. This control device 50 includes a power receiver 52, a controller 54, a load modulator 56, a charger 58, and a discharger 60. Also, the control device 50 can include a nonvolatile memory 62 and a detector 64. Note that the control device 50 is not limited to the configuration in FIG. 2, and various modifications in which some of the constituent elements are omitted, other constituent elements are added, the connective relation is changed, and the like can be implemented. For example, a modification can be implemented in which the power receiver 52 is provided outside of the control device 50, and the like.

The power receiver 52 receives power from the power transmitting device 10.

The controller 54 performs various types of control processing of the control device 50 on the power receiving side. For example, the controller 54 controls the load modulator 56, the charger 58, and the discharger 60. The controller 54 can also control the power receiver 52, a nonvolatile memory 62, and a detector 64. This controller 54 can be realized by a logic circuit generated by an automated place-and-route method such as a gate array, or various types of processor such as a microcomputer, for example.

The load modulator 56 performs load modulation.

The charger 58 performs charging of the battery 90 (charging control). For example, the charger 58 charges the battery 90 using the power which the power receiver 52 received from the power transmitting device 10. For example, the charger 58 is supplied with a voltage that is based on the rectification voltage VCC (DC voltage in a broad sense) from the power receiver 52, and charges the battery 90.

The discharger 60 performs a discharging operation of the battery 90. For example, the discharger 60 performs the discharging operation of the battery 90, and supplies power from the battery 90 to the power supply target 100. Hereinafter, in this description, power supply from the discharger 60 to the power supply target 100 is referred to as a power supply operation. For example, the discharger 60 is supplied with battery voltage VBAT from the battery 90, and supplies output voltage VOUT to the power supply target 100. This discharger 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharger 60 (charge pump circuit) operates with the battery voltage VBAT as the power supply voltage, for example.

The battery 90 is, for example, a rechargeable secondary battery, and is, for example, a lithium battery (such as a lithium ion secondary battery or a lithium ion polymer secondary battery), a nickel battery (such as a nickel-hydrogen storage battery or a nickel-cadmium storage battery), or the like. The power supply target 100 is, for example, a device (integrated circuit device) such as a processor (DSP, microcomputer) that is provided in the electronic apparatus 510 (FIG. 1) in which the power receiving device 40 is incorporated, and is a power supply target of the battery 90.

The detector 64 performs various detection operations. Detection of over-discharge, over-voltage, over-current, and abnormal temperature (high temperature, low temperature) are envisioned as detection operations performed by the detector 64. For example, due to detection of over-voltage and abnormal temperature by the detector 64 at the time of charging, over-voltage protection, high-temperature protection, and low-temperature protection can be realized. Also, due to detection of over-discharge and over-current by the detector 64 at the time of discharging, over-discharge protection and over-current protection can be realized.

3. Operation Sequence of Contactless Power Transmission System

Figure 3:
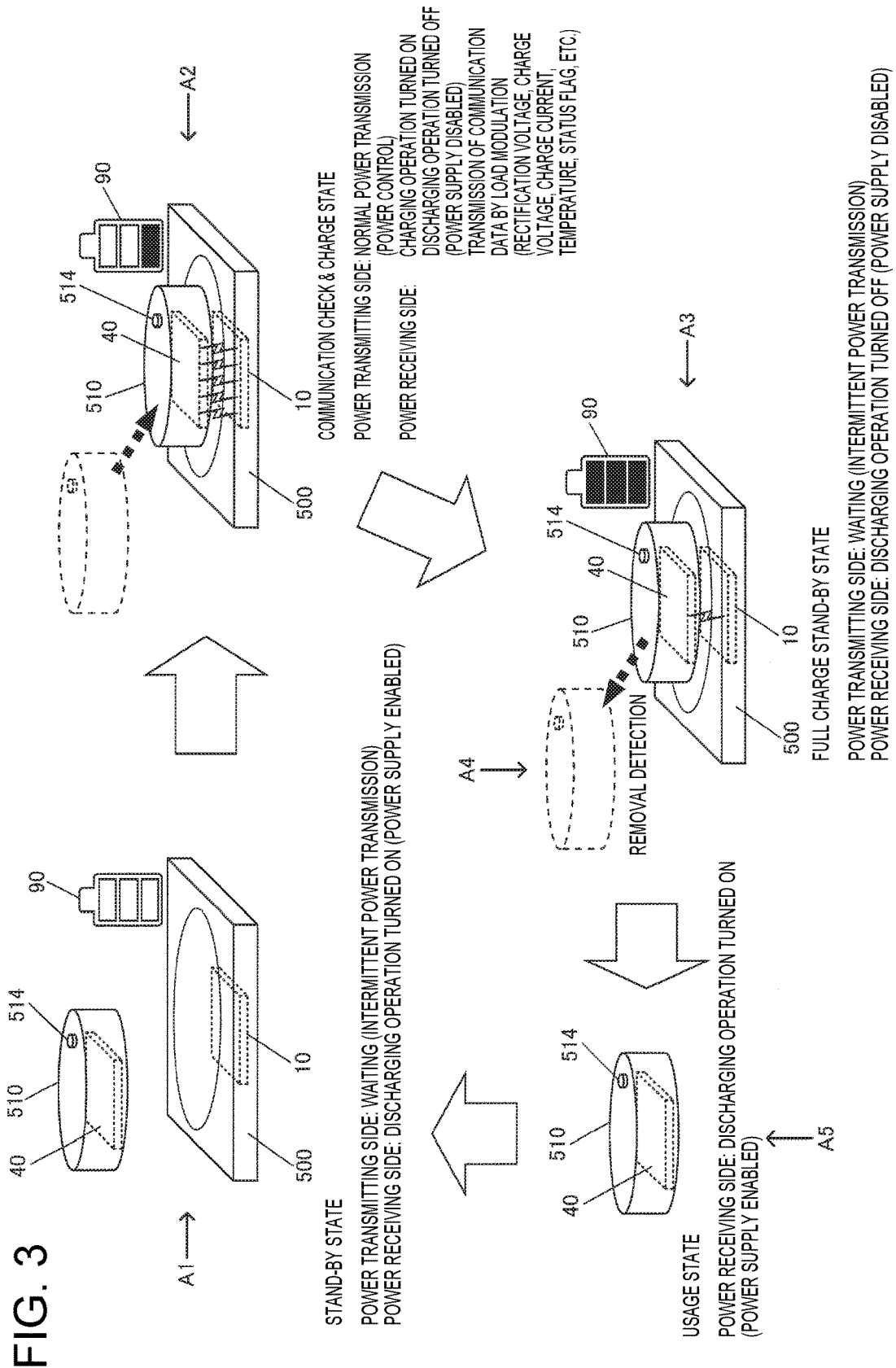
FIG. 3 is a diagram for describing an example of an operation sequence of the contactless power transmission system.

Next, an example of an operation sequence of the contactless power transmission system of the present embodiment will be described. FIG. 3 is a diagram for describing an outline of the operation sequence.

In A1 of FIG. 3, the electronic apparatus 510 including the power receiving device 40 is not placed on the charger 500 including the power transmitting device 10, and is in a removed state. In this case, a stand-by state is realized. In this stand-by state, the power transmitting side enters a waiting state, and the power receiving side enters a state in which the discharging operation is turned on. Note that, even in the removed state, if the signal from the magnetic detection element 80 is active or the like, the discharging operation is turned off. The detail of control of the discharging operation in the removed state will be described later.

Specifically, in the stand-by state, the power transmitter 12 in the power transmitting device 10 performs intermittent power transmission for landing detection. In other words, the power transmitter 12 enters a state in which landing of the electronic apparatus 510 is detected by performing intermittent power transmission for each predetermined period instead of continuous power transmission such as normal power transmission. Also, in the stand-by state, the discharging operation to the power supply target 100 is turned on in the power receiving device 40, and power supply to the power supply target 100 is enabled. That is, the discharger 60 of the power receiving device 40 performs an operation for discharging power from the battery 90 to the power supply target 100. Accordingly, the power supply target 100 such as a processor is supplied with the power from the battery 90, and thus becomes operational.

As shown in A2 of FIG. 3, when the electronic apparatus 510 is placed on the charger 500 and landing is detected, a communication check & charge state is realized. In the communication check & charge state, normal power transmission is performed on the power transmitting side, and on the power receiving side, the discharging operation is turned off at the same time that the charging operation is turned on. Also, the power receiving side transmits communication data using load modulation.

Specifically, in the communication check & charge state, the power transmitter 12 in the power transmitting device 10 performs normal power transmission which is continuous power transmission. At this time, the power transmitter 12 performs normal power transmission while performing power control in which the power is variably changed according to the state of power transmission or the like. Also, control according to the charge state of the battery 90 is performed. The power transmission state is a state to be determined based on a positional relationship (distance between coils or the like) between the primary coil L1 and the secondary coil L2 or the like, and can be determined based on information such as the rectification voltage VCC, which is the output voltage from the power receiver 52. The charge state of the battery 90 can be determined based on information such as the battery voltage VBAT.

Also, in the communication check & charge state, the charging operation of the charger 58 of the power receiving device 40 is turned on, and charging of the battery 90 is performed based on the power received by the power receiver 52. Also, the discharging operation of the discharger 60 is turned off, and power from the battery 90 is no longer supplied to the power supply target 100. Moreover, in the communication check & charge state, communication data is transmitted to the power transmitting side by load modulation performed by the load modulator 56.

As shown in A3 of FIG. 3, when full charge of the battery 90 is detected, a full-charge-stand-by state is realized. In the full-charge-stand-by state, the power transmitting side enters the waiting state, and the power receiving side remains in the state in which the discharging operation is off.

Specifically, the power transmitter 12 performs intermittent power transmission for removal detection, for example. In other words, the power transmitter 12 enters a state in which removal of the electronic apparatus 510 is detected by performing intermittent power transmission for each predetermined period instead of continuous power transmission as normal power transmission. Also, the discharging operation of the discharger 60 remains off, and power supply to the power supply target 100 also remains disabled.

When removal of the electronic apparatus 510 is detected as shown in A4 of FIG. 3, the electronic apparatus 510 enters a usage state, and the discharging operation of the power receiving side is turned on, as shown in A5 in FIG. 3.

Specifically, the discharging operation of the discharger 60 is switched from off to on, and power from the battery 90 is supplied to the power supply target 100 via the discharger 60. Accordingly, due to the power from the battery 90 being supplied, the power supply target 100 such as a processor operates, and the electronic apparatus 510 enters a state in which the user can use the electronic apparatus 510 normally.

In the present embodiment, as shown in A2 of FIG. 3, when landing of the electronic apparatus 510 is detected, normal power transmission is performed, and regular load modulation is performed in this normal power transmission period. Also, when landing is detected, the discharging operation of the discharger 60 is stopped. In this normal load modulation, communication data including information for controlling power on the power transmitting side, and information representing the status on the power receiving side are transmitted from the power receiving side to the power transmitting side. For example, by transmitting the information (power transmission status information) for power control, optimum power control based on the positional relationship or the like between the primary coil L1 and the secondary coil L2 can be realized. Also, by transmitting the information representing the status on the power receiving side, an optimum and safe charging environment can be realized. Also, in the present embodiment, normal power transmission continues while the load modulation continues, and the discharging operation of the discharger 60 remains off.

Also, in the present embodiment, as shown in A3 in FIG. 3, when full charge of the battery 90 is detected, normal power transmission is stopped, and intermittent power transmission for removal detection is performed. Then, as shown in A4 and A5 of FIG. 3, when removal is detected and the removed period begins, the discharging operation of the discharger 60 is performed. Accordingly, the power from the battery 90 is supplied to the power supply target 100, and normal operation of the electronic apparatus 510 becomes possible. Note that landing detection and removal detection are performed based on the output voltage (e.g., rectification voltage VCC) of the power receiver 52.

In the present embodiment, as described above, the discharging operation on the power supply target 100 is turned off in a charge period (normal power transmission period) of the battery 90 of the electronic apparatus 510, and thus, a case in which power is wastefully consumed in the charge period by the power supply target 100 can be suppressed.

When removal of the electronic apparatus 510 is detected, the discharging operation to the power supply target 100 is turned on along with switching being performed from normal power transmission to intermittent power transmission. As a result of the discharging operation turning on, power from the battery 90 is supplied to the power supply target 100, and normal operation of the power supply target 100 such as a processor (DSP) becomes possible. In this way, an operation sequence of preferable contactless power transmission can be realized in a type of electronic apparatus 510 (electronic apparatus such as a hearing aid that is worn by a user, for example) that does not operate in the charge period during which the electronic apparatus 510 is placed on the charger 500, for example. That is, in this type of electronic apparatus 510, reduction of power consumption can be realized by the discharging operation of the power from the battery 90 being turned off in a charging period (normal power transmitting period). Then, upon detecting removal, due to the discharging operation being automatically turned on, the power from the battery 90 is supplied to various devices serving as the power supply target 100 of the electronic apparatus 510, and the devices can operate, and thus the electronic apparatus can automatically transition to a normal operation mode.

4. Power Supply Control

Next, a specific example of power supply control will be described. First, methods for using the magnetic detection element 80 and the monitor 70 (switch 514) will be described respectively, and after that, a specific example of a combination of the methods will be described.

4.1 Control Using Magnetic Detection Element

As described above, in this embodiment, the discharging by the discharger 60 is started with detection of removal of the power receiving device 40 as a trigger. Specifically, the controller 54 may start discharging of the discharger 60 after the output voltage of the power receiver 52 VCC decreased (in a more limited sense, after the output voltage becomes lower than the determination threshold) and a startup time of the discharging operation has passed.

When performing such control, the controller 54 may start discharging of the capacitor that is charged while the power receiver 52 is receiving power when the output voltage of the power receiver 52 VCC becomes lower than the determination threshold, and may start discharging of the discharger 60 when the voltage of the capacitor becomes lower than or equal a predetermined voltage VT. The capacitor referred to here is a start capacitor in FIGS. 6 and 7. This capacitor can be provided as an external part of the control device 50.

By using the start capacitor, it becomes possible for the discharger 60 not to operate discharging while intermittent power transmitting is being performed by the power transmitting device 10. In other words, the controller 54 stops discharging of the discharger 60 in the normal power transmitting period. That is, since discharging is not started even after full charging unless removal is performed, power consumption can be reduced. On the other hand, since discharging by the discharger 60 is started if the charge voltage of the start capacitor becomes less or equal to VT, that is, if power receiving by the power receiver 52 is not performed in the predetermined period TST, it becomes possible to start discharging automatically by removal of the power receiving device 40.

However, when discharging is automatically started in this way, it is necessary to consider power consumption in a circumstance where the electronic apparatus 510 including the power receiving device 40 is not used although it has been removed. Typically, it is power consumption in the period when the electronic apparatus 510 is stored or carried in a storage case.

In this case, power control using the switch 514 may be performed as disclosed in JP-A-2016-214027. However, in the method according to JP-A-2016-214027, since it is necessary for the user to operate the switch 514 when the electronic apparatus is not used, a burden is imposed on the user. Particularly, when carrying the electronic apparatus in the storage case, since it is obvious that the electronic apparatus is not used, it is desirable to stop discharging (power supply operation) automatically without the user performing an operation.

Accordingly, in this embodiment, the controller 54 stops the power supply operation to the power supply target 100 when the magnetic detection signal from a magnetic detection element 80 becomes active (after being activated). The magnetic detection element 80 referred to here is an element that is provided in the electronic apparatus 510 (power receiving device 40) and detects magnetic. The magnetic detection element 80 may also be, for example, a Hall terminal utilizing the Hall effect. Various elements such as an InSb hall element, a GaAs hall element, an InAs hall element, or the like, can be used as the Hall element.

More specifically, the controller 54 may include a magnetic detection circuit 81 (Hall IC) having the magnetic detection element 80. The magnetic detection circuit 81 is configured to include, for example, an offset removal circuit, an amplification circuit, an A/D conversion circuit (sample hold circuit and comparison circuit), a latch circuit, and the like, as well as the magnetic detection element 80. In this regard, various modifications of the specific configuration of the magnetic detection circuit 81 can be implemented, and in this embodiment, a magnetic detection circuit (Hall IC) having a known configuration can be widely used. The magnetic detection signal of this embodiment may be output from the magnetic detection circuit 81, and is a signal by which active/inactive (on/off) is determined is response to strength and polarity of magnetic field. Note that, a state in which the magnetic detection signal is active indicates a state in which a predetermined strength and polarity of magnetic field is detected by the magnetic detection element 80, and a state in which the magnetic detection signal is inactive indicates a state in which magnetic field is not detected. For example, the magnetic detection signal is a signal that becomes H level when it is active, and becomes L level when it is inactive, but the magnetic detection signal is not limited to this.

Figure 4:
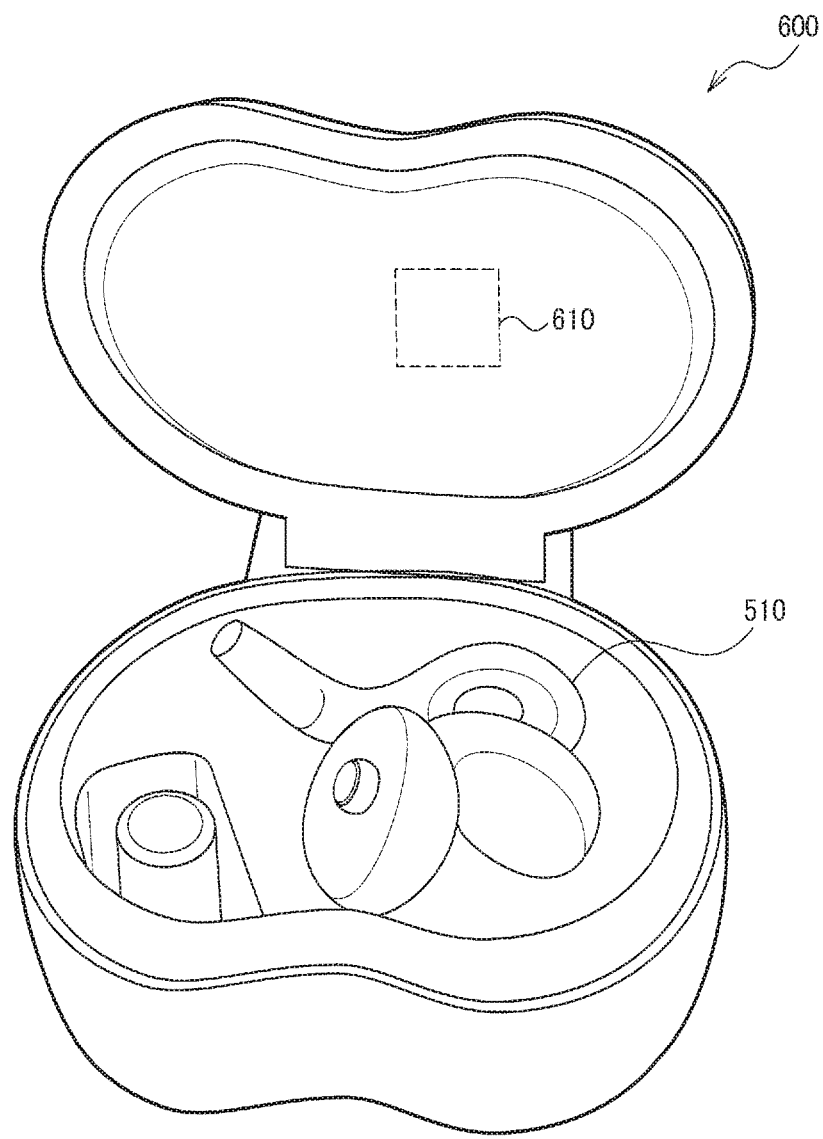
FIG. 4 is an example of an electronic apparatus housed in a case.

FIG. 4 is an example of a case 600 to store the electronic apparatus 510 (in a narrow sense, a hearing aid). In this embodiment, as shown in FIG. 4, a magnet 610 is provided in a part of the case 600. The polarity of the magnet 610 is to be aligned with the characteristics of the magnetic detection element 80. When the electronic apparatus 510 is stored in the case 600, the magnetic detection element 80 outputs an active magnetic detection signal (for example, an H level signal) according to the magnetic field when the magnet 610 is located nearby.

In this way, the controller 54 can stop discharging operation (power supply operation) based on the magnetic detection signal from the magnetic detection element 80. That is, even if discharging is started with removal as a trigger, since the discharging can be appropriately stopped, power consumption can be reduced. In such case, since the power supply operation can be stopped by natural operation such as placing the electronic apparatus 510 in the case 600, the burden on the user can be reduced.

Also, the controller 54 starts the power supply operation on the power supply target 100 when magnetic detection signal becomes inactive (for example, L level signal) (after turning inactive). In the example in FIG. 4, when the electronic apparatus 510 is not housed, since the magnetic detection element 80 does not detect magnetic flux of the magnet 610, the magnetic detection element 80 outputs an inactive magnetic detection signal. That is, when the electronic apparatus 510 is taken out of the case 600, power supply operation to the power supply target 100 can be restarted.

In FIG. 4, the magnet 610 is located on a lid side of the case 600, with consideration for the fact that the magnetic detection signal becomes active when the user is less likely to use the electronic apparatus 510. In this case, when the electronic apparatus 510 is placed in a predetermined place in the case 600 and the lid of the case 600 is closed, the magnetic detection signal becomes active. Note that the arrangement of the magnet 610 is not limited to that of FIG. 4, and the magnet 610 can be located in the other position in the case 600. In addition, although an example has been described in which the magnet 610 is provided in the case 600, the position to mount the magnet 610 is not limited to this. The magnet may be provided in a position or device (excluding the charger 500) where the electronic apparatus 510 is located when not in use.

4.2 Control by Switch

Also, similarly to JP-A-2016-214027, it is also possible for the control device 50 to perform power control using the switch 514. The control device 50 includes a monitor 70 that monitors the operation state of the switch 514, and the controller 54 stops power supply operation to the power supply target 100 (stops discharging of the discharger 60) when an off operation of the switch 514 is detected by the monitor 70.

In this way, even if discharging is started with removal as a trigger, since discharging can be stopped by operating the switch 514, power consumption can be reduced.

4.3 Combined Power Control

As described above, in this embodiment, power control can be performed by detecting removal/landing, the magnetic detection signal, and the detection of operation of the switch 514. In addition, it is also possible to stop the discharging operation if over-discharging or over-current is detected.

FIG. 5 is a diagram for describing control in the controller 54 in the case where these methods are combined. As described above, the controller 54 performs removal detection and landing detection of the power receiving device 40. Specifically, the controller 54 starts the power supply operation to the power supply target 100 on condition that removal of the power receiving device 40 is detected (after detecting removal). Then, the controller 54 stops power supply operation on condition that landing of the power receiving device 40 is detected (after detecting landing). Since discharging is stopped upon detecting landing, monitoring the switch 514 by the monitor 70 and detection by the magnetic detection element 80 are not needed.

Also, the controller 54 stops the power supply operation when at least one of over-discharging and over-current is detected by the detector 64 (over-discharge detection circuit). Also in this case, since discharging is not performed, monitoring the switch 514 by the monitor 70 and detection by the magnetic detection element 80 are not needed.

The monitor 70 detects the operation state of the switch 514 when removal has been detected and over-discharging and over-current have not been detected. As described above, when the off operation is detected by the monitor 70, the controller 54 stops the discharging operation, and when the on operation is detected by the monitor 70, the controller starts (resumes) the discharging operation.

Then, the controller 54 starts the power supply operation on the power supply target 100 on condition that removal of the power receiving device 40 is detected (after detecting removal), and stops the power supply operation when the removed state and magnetic detection signal becomes active. Also, the controller 54 starts (resumes) the power supply operation when the removed state and magnetic detection signal becomes inactive. That is, the control using the magnetic detection signal is performed on condition that removal has been detected (during the removed state). Furthermore, it is preferable that the control using the magnetic detection signal is executed on condition that the off operation of the switch 514 has not been detected, and over-discharging and over-current have not been detected. This is because, if power supply operation is already stopped due to another condition, the necessity to implement further control (determination of the condition) using the magnetic detection element 80 is low.

Also, if the necessity to implement the control using the magnetic detection element 80 is low, it is also possible to turn off the power supply itself to the magnetic detection element 80. In this way, since unnecessary operation of the magnetic detection element 80 can be prevented, power consumption can be reduced.

Specifically, the controller 54 can also perform control to turn off power supply to the magnetic detection element 80 on condition that landing of the power receiving device 40 is detected. Also, the controller 54 can also perform control to turn off power supply to the magnetic detection element 80 on condition that the off operation of the switch 514 has been detected by the monitor 70. Also, the controller 54 can perform control to turn off the power supply to the magnetic detection element 80 when at least one of over-discharge and over-current is detected. Note that the magnetic detection element 80 (magnetic detection circuit 81) does not need to detect magnetic field constantly in the period in which power supply is on, and thus performs an intermittent operation for detecting a magnetic field for each predetermined period.

Figure 6:
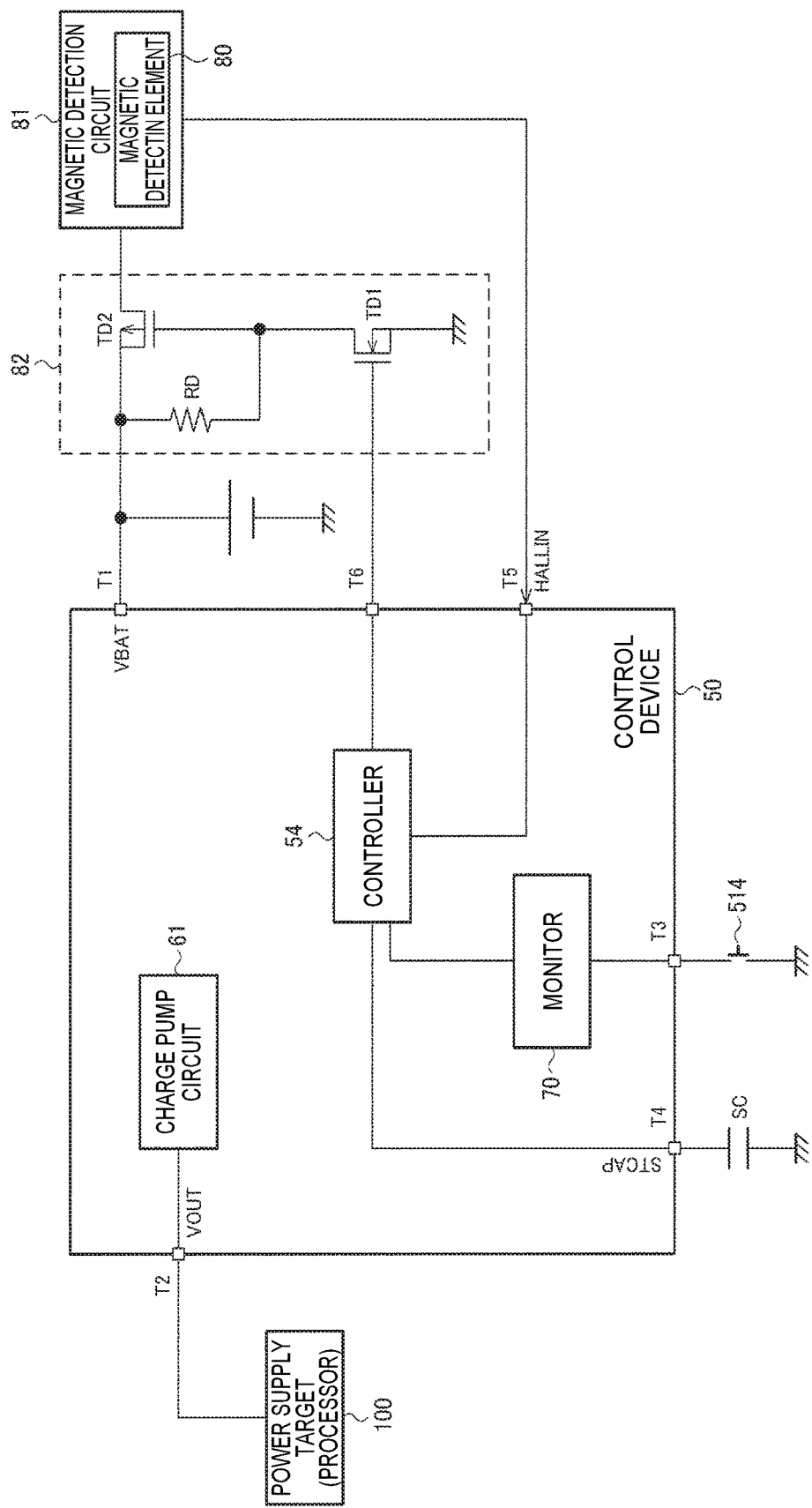
FIG. 6 is a configuration example of an electronic apparatus including a power receiving device.

FIG. 6 is a configuration example of the electronic apparatus 510 (power receiving device 40) for performing control so as to turn off power supply to the magnetic detection element 80. Note that, since the detail of the electronic apparatus 510 (power receiving device 40) was described as above with reference to FIG. 2 and the like, a part of configuration is shown in simplified form in FIG. 6.

The control device 50 of the power receiving device 40 includes terminals T1 to T5. Note that various modifications such as omitting some of the terminals, adding other terminals, and the like can be implemented. A terminal T1 is a terminal from which battery voltage VBAT is output. A terminal T2 is a terminal to which the output voltage VOUT obtained through voltage conversion is output by the charge pump circuit 61 of the discharger 60. A terminal T3 is a terminal connected to the switch 514. A terminal T4 is a terminal connected to a start capacitor (SC in FIG. 6) and to which a start capacitor voltage (STCAP in FIG. 6) is input. Note that, although not shown in FIG. 6, it is preferable to provide a determination circuit that performs removal detection between the terminal T4 and the controller 54. A terminal T5 is a terminal to which the magnetic detection signal (HALLIN) from the magnetic detection circuit 81 is input.

Also, the control device 50 includes a power control signal terminal T6 that is used for controlling on/off of power supply to the magnetic detection element 80. Then, the controller 54 controls activation/deactivation of the output signal of the power control signal terminal T6.

In the example in FIG. 6, the power receiving device 40 includes the power source supply circuit 82 that controls on/off of supplying battery voltage VBAT to the magnetic detection element 80, and the power control signal terminal T6 is connected to the power source supply circuit 82. Specifically, power source supply circuit 82 includes a first transistor TD1, a second transistor TD2, and a resistor RD.

In the first transistor TD1, a signal (output of power control signal terminal T6) from the controller 54 is supplied to the gate terminal. Also, the source terminal of the first transistor TD1 is connected to ground. In the second transistor TD2, a gate terminal is connected to the drain terminal of the first transistor TD1, battery voltage VBAT is supplied to the source terminal, and the drain terminal is connected to the magnetic detection element 80 (magnetic detection circuit 81). The resistor RD is provided between the source terminal and the gate terminal of the second transistor TD2.

The controller 54, when removal is not detected (when landing is detected), when the switch 514 is detected as turned off by the monitor 70, or when at least one of over-discharging and over-current is detected, outputs an inactive signal from the power control signal terminal T6. Although the inactive signal is an L level signal in FIG. 6, a skilled person will readily appreciate that the relation between active/inactive and H/L level can be changed.

Due to an inactive (L level) signal being output from the power control signal terminal T6, the first transistor TD1 and the second transistor TD2 turn off, and power supply to the magnetic detection element 80 turns off. In this way, as described above, power supply to the magnetic detection element 80 can be turned off in the state where the magnetic detection element 80 does not need to operate, and thus power consumption can be reduced.

On the other hand, if the switch 514 has been turned on and over-discharging or over-current is not detected at the time of detecting removal, the controller 54 outputs an active (H level) signal from the power control signal terminal T6. In this case, the first transistor TD1 and the second transistor TD2 are turned on, and power supply to the magnetic detection element 80 is turned on. Accordingly, the magnetic detection signal (HALLIN) is input to the terminal T5 and the controller 54 becomes capable of performing control based on the magnetic detection signal.

5. Modifications

In the following, a number of modifications will be described.

In FIG. 6, the signal from the power control signal terminal T6 is supplied to the power source supply circuit 82, and power supply to the magnetic detection element 80 (magnetic detection circuit 81) is controlled by the power source supply circuit 82. However, depending on a circuit device (IC, chip), in some cases it is possible to input a chip enable signal for blocking a signal path to the circuit device (stopping the operation of the circuit device). Accordingly, it is also possible to adopt a configuration that omits the power source supply circuit 82 from the power receiving device 40, and supplies the signal from the power control signal terminal T6 to the chip enable signal input terminal of the magnetic detection circuit 81.

As described above, a method has been described in which on/off of power supply to the magnetic detection element 80 is controlled by interlocking on/off of the power supply operation (discharging operation) to the power supply target 100, using the magnetic detection element 80 as a device to which the battery voltage VBAT is supplied. However, the device to which battery voltage VBAT is supplied, and whose power supply is desired to be interlocked with the power supply target 100, is not limited to the magnetic detection element 80.

For example, when the electronic apparatus 510 includes a processor (e.g., DSP) which is the power supply target 100, and a communicator 110 (e.g., Bluetooth low energy IC) controlled by the processor, it is not possible to execute communication by supplying power only to the communicator 110 while power is not supplied to the processor. Accordingly, it is desirable to interlock power supply to the processor with power supply to the communicator 110.

Figure 7:
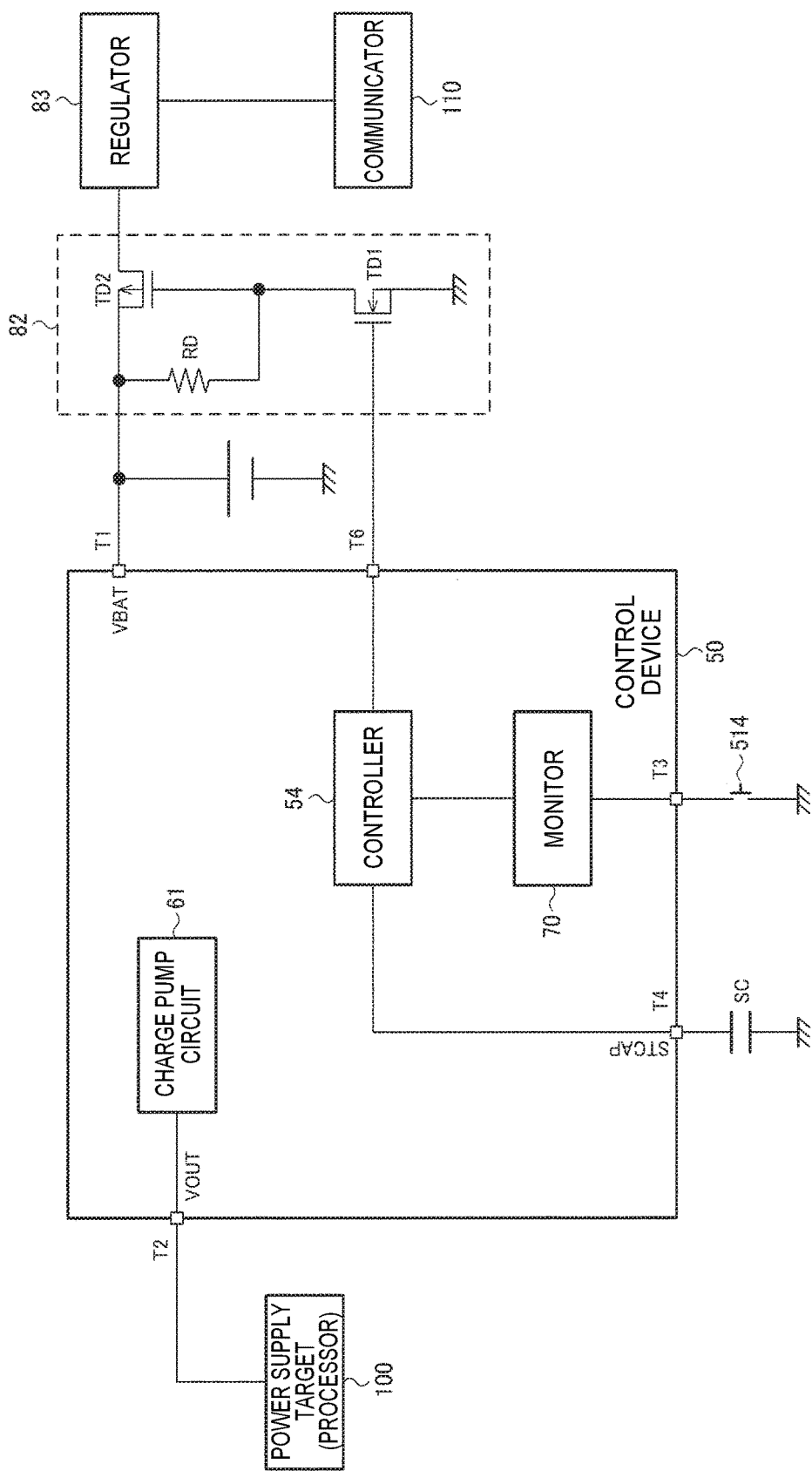
FIG. 7 is another configuration example of an electronic apparatus including a power receiving device.

FIG. 7 is a configuration example of the power receiving device 40 in this modification. Compared with FIG. 6, the magnetic detection circuit 81 is changed to a regulator 83. Then, it is configured such that battery voltage VBAT can be supplied to the regulator 83, the regulator 83 performs voltage conversion of battery voltage VBAT, and supplies the voltage after conversion to the communicator 110.

That is, the method of this embodiment can be applied to a control device 50 of a power receiving device 40 that receives power in a contactless manner, including a discharger 60 that performs a discharging operation of the battery 90 that is charged with the received power and performs a power supply operation in which power from the battery 90 is supplied to the power supply target 100, a controller 54 that control the discharger 60, and a power control signal terminal T6 for controlling on/off of power supply to a device that operates with a battery voltage VBAT (the regulator 83 in the example in FIG. 7). Then, the controller 54 of the control device 50 performs control to activate the output of the power control signal terminal T6 and turn on supply of the battery voltage VBAT to the device, when removal of the power receiving device 40 is detected, and performs control to deactivate the output of the power control signal terminal T6 and turn off supply of the battery voltage VBAT to the device, when landing of the power receiving device 40 is detected.

In this way, it becomes possible to control on/off of power supply to the device in accordance with removal/landing detection. In this embodiment, it is assumed that power supply to the power supply target 100 (processor) is controlled according to removal/landing detection. Therefore, according to the method in this modification, it becomes possible to interlock the power supply operation to the power supply target 100 with power supply to the device, whereby efficient power control becomes possible.

Note that, in FIG. 3, although the example has been described in which the regulator 83 is used as a device that operates with the battery voltage VBAT, it goes without saying that the invention is extendable to other devices (circuit devices).

In addition, the method of this embodiment can be applied to the electronic apparatus 510 including the control device 50. As described above, various types of the electronic apparatus 510 including the control device 50 are conceivable such as a hearing aid or the like. Also, the method of this embodiment can be applied to a contactless power transmission system including the above-described power transmitting device 10 and power receiving device 40.

This application claims priority from Japanese Patent Application No. 2017-039213 filed in the Japanese Patent Office on Mar. 2, 2017, the entire disclosure of which is hereby incorporated by reference in its entirely.

What is claimed is:

1. A control device for a power receiving device that receives power supplied from a power transmitting device by contactless power transmission, comprising:
   a charger configured to charge a battery based on the received power;
   a discharger configured to perform a discharging operation of the battery and a power supply operation in which power from the battery is supplied to a power supply target; and
   a controller configured to control the discharger,
   wherein the controller stops the power supply operation when a magnetic detection signal from a magnetic detection element becomes active.

2. The control device according to claim 1, wherein the controller starts the power supply operation when the magnetic detection signal becomes inactive.

3. The control device according to claim 1, wherein the controller starts the power supply operation on condition that removal of the power receiving device is detected, and
   stops the power supply operation when the magnetic detection signal becomes active.

4. The control device according to claim 1, comprising:
   a power control signal terminal configured to control on and off of power supply to the magnetic detection element,
   wherein the controller controls activation and deactivation of the output signal of the power control signal terminal.

5. The control device according to claim 1, wherein the controller performs control to turn off the power supply to the magnetic detection element on condition that landing of the power receiving device is detected.

6. The control device according to claim 1, wherein the controller stops the power supply operation on condition that landing of the power receiving device is detected.

7. The control device according to claim 1, wherein
the controller performs control to turn off power supply to the magnetic detection element when at least one of over-discharge and over-current is detected.

8. The control device according to claim 7, wherein
the controller stops the power supply operation on condition that at least one of over-discharge and over-current is detected.

9. The control device according to claim 1, comprising:
a monitor configured to monitor an operation state of a switch, wherein
the controller stops the power supply operation when an off operation of the switch is detected by the monitor.

10. The control device according to claim 9, wherein
the controller performs control to turn off the power supply to the magnetic detection element when the off operation of the switch is detected by the monitor.

11. A control device for a power receiving device that receives power supplied from a power transmitting device by wireless power transmission, comprising:
a discharger configured to perform a discharging operation of a battery that is charged based on the received power, and perform a power supply operation for supplying power from the battery to a power supply target;
a controller configured to control the discharger; and
and a power control signal terminal configured to control on and off of power supplied to a device that operates with battery voltage,
wherein the controller, when removal of the power receiving device is detected, performs control to activate the output of the power control signal terminal and turn on the supply of the battery voltage to the device, and
when landing of the power receiving device is detected, performs control to deactivate the output of the power control signal terminal and turn off the supply of the battery voltage to the device.

12. A power receiving device comprising the control device according to claim 1.

13. A power receiving device comprising:
the control device according to claim 1; and
a power source supply circuit configured to control on and off of supply of battery voltage to the magnetic detection element,
wherein the power supply circuit includes:
a first transistor in which the signal from the controller is supplied to a gate terminal;
a second transistor in which a gate terminal is connected to a drain terminal of the first transistor, the battery voltage is supplied to a source terminal, and a drain terminal is connected to the magnetic detection element; and
a resistor provided between the source terminal and the gate terminal of the second transistor.

14. An electronic apparatus comprising the control device according to claim 1.

* * * * *